(12) United States Patent
Tsukamoto et al.

(10) Patent No.: US 11,130,266 B2
(45) Date of Patent: Sep. 28, 2021

(54) MOLDED PLASTIC ARTICLE AND METHOD OF MANUFACTURING SAME

(71) Applicant: NIPPON THERMOSTAT CO., LTD., Tokyo (JP)

(72) Inventors: Daisuke Tsukamoto, Tokyo (JP); Susumu Mikami, Tokyo (JP); Masahiro Aburakawa, Tokyo (JP); Hiroshi Suda, Tokyo (JP)

(73) Assignee: NIPPON THERMOSTAT CO., LTD., Tokyo (JP)

( * ) Notice: Subject to any disclaimer, the term of this patent is extended or adjusted under 35 U.S.C. 154(b) by 346 days.

(21) Appl. No.: 16/224,789

(22) Filed: Dec. 19, 2018

(65) Prior Publication Data

US 2019/0118438 A1 Apr. 25, 2019

Related U.S. Application Data

(63) Continuation of application No. PCT/JP2017/011143, filed on Mar. 21, 2017.

(30) Foreign Application Priority Data

Jul. 15, 2016 (JP) .............................. JP2016-140416

(51) Int. Cl.
*B32B 1/08* (2006.01)
*B29C 45/14* (2006.01)
(Continued)

(52) U.S. Cl.
CPC .... *B29C 45/14467* (2013.01); *B29C 45/0062* (2013.01); *B29C 45/1657* (2013.01);
(Continued)

(58) Field of Classification Search
CPC .......... B29L 2023/00; B29L 2023/004; B29L 2023/005–007; B29L 2023/22–245;
(Continued)

(56) References Cited

U.S. PATENT DOCUMENTS 4,544,588 A * 10/1985 Schauf .............. B29C 45/14467
156/292
5,538,571 A * 7/1996 Miyajima ............... B29C 66/54
156/73.1
(Continued)

FOREIGN PATENT DOCUMENTS

JP H0483621 A 3/1992
JP H06-246781 A * 9/1994
(Continued)

OTHER PUBLICATIONS

Machine translation of JP H06/246781 A, obtained from EspaceNet (Year: 2021).*
(Continued)

*Primary Examiner* — Z. Jim Yang
(74) *Attorney, Agent, or Firm* — Joseph P. Farrar; Isshiki & Partners

(57) ABSTRACT

A molded plastic article having a bonded plastic portion 6 bonding a first body and a second body together; a connecting plastic portion 8, formed by solidifying the molten plastic flowing out from the plastic channel, having one end connected to the bonding plastic portion 6; and a flow tab plastic portion 7 formed by solidifying the molten plastic, connected to the other end of the connecting plastic portion 8 connected to the other end portion of the 8. A portion of reduced diameter 7a is provided to the flow tab plastic portion 7 on the connecting plastic portion side.

5 Claims, 6 Drawing Sheets

(51) Int. Cl.
   *B29C 65/70* (2006.01)
   *B29C 45/00* (2006.01)
   *B29C 45/16* (2006.01)
   *B29C 45/33* (2006.01)
   *B29C 45/40* (2006.01)
   *B29L 23/00* (2006.01)
   *F02M 35/10* (2006.01)

(52) U.S. Cl.
   CPC .............. *B29C 45/33* (2013.01); *B29C 45/40* (2013.01); *B29C 65/70* (2013.01); *B32B 1/08* (2013.01); *B29C 2045/1486* (2013.01); *B29C 2045/14524* (2013.01); *B29L 2023/00* (2013.01); *F02M 35/10144* (2013.01)

(58) Field of Classification Search
   CPC .......... B29L 2031/7492; B29C 66/131; B29C 66/1312; B29C 66/54–549; B29C 66/53–536; B29C 66/32; B29C 66/322; B29C 66/326; B29C 66/3262; B29C 66/328–3284; F02M 35/10091–1294
   See application file for complete search history.

(56) References Cited

U.S. PATENT DOCUMENTS

| | | | | |
|---|---|---|---|---|
| 6,368,448 | B1 * | 4/2002 | Okamura | .............. B29C 65/342 156/274.2 |
| 2003/0111765 | A1 * | 6/2003 | Ichikawa | ............ B29C 45/0062 264/248 |
| 2004/0159298 | A1 * | 8/2004 | Ino | ................... F02M 35/10354 123/184.21 |
| 2004/0234712 | A1 | 11/2004 | Arai et al. | |
| 2005/0037167 | A1 * | 2/2005 | Nishida | ............... B29C 45/0062 428/35.7 |
| 2006/0038319 | A1 * | 2/2006 | Arai | ..................... B29C 45/0062 264/251 |
| 2012/0328820 | A1 * | 12/2012 | Goehlich | ............ B29C 66/0222 428/58 |
| 2013/0228147 | A1 * | 9/2013 | Grass | .................... B29C 65/564 123/184.21 |
| 2015/0096365 | A1 * | 4/2015 | Ooga | ................ B29C 66/12461 73/204.11 |
| 2016/0281571 | A1 * | 9/2016 | Sun | ........................ B29C 45/006 |
| 2018/0093421 | A1 * | 4/2018 | Mori | ................ F02M 35/10354 |
| 2019/0337202 | A1 * | 11/2019 | Gobel | ................. B29C 45/0062 |

FOREIGN PATENT DOCUMENTS

| | | | | |
|---|---|---|---|---|
| JP | H1015947 | A | | 1/1998 |
| JP | 2000280353 | A | * 10/2000 | ......... B29C 45/0062 |
| JP | 2003154577 | A | | 5/2003 |
| JP | 2004345242 | A | | 12/2004 |
| JP | 2006035630 | A | | 2/2006 |
| JP | 5471197 | B2 | | 4/2014 |

OTHER PUBLICATIONS

International Search Report (ISR) for Application No. PCT/JP2017/011143 dated May 9, 2017.
Translation of the ISR for Application No. PCT/JP2017/011143 dated May 9, 2017.
Written Opinion of the International Search Authority for Application No. PCT/JP2017/011143 dated May 9, 2017.

* cited by examiner

FIG. 3
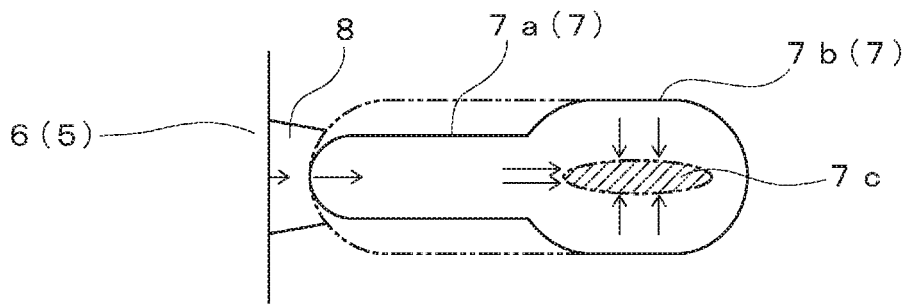
FIG. 4
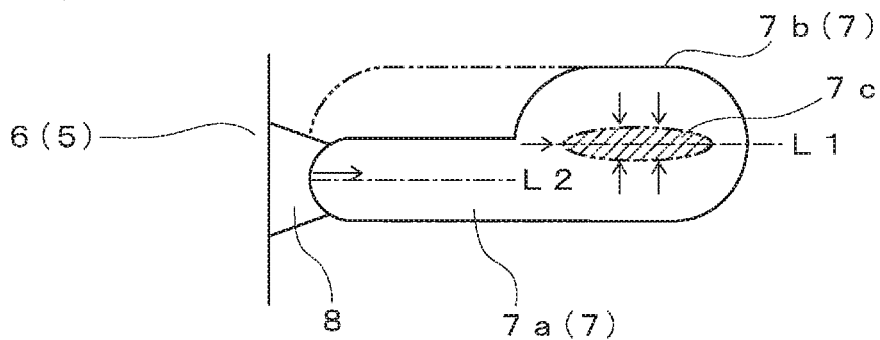
FIG. 5
(a)
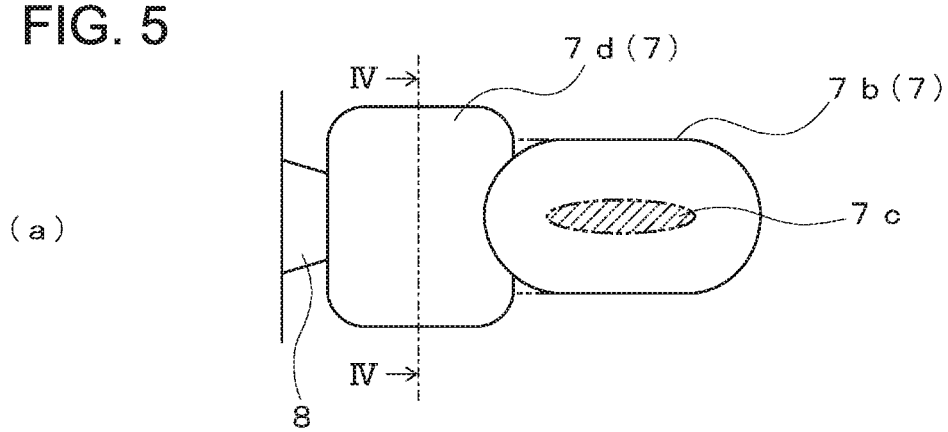
(b)
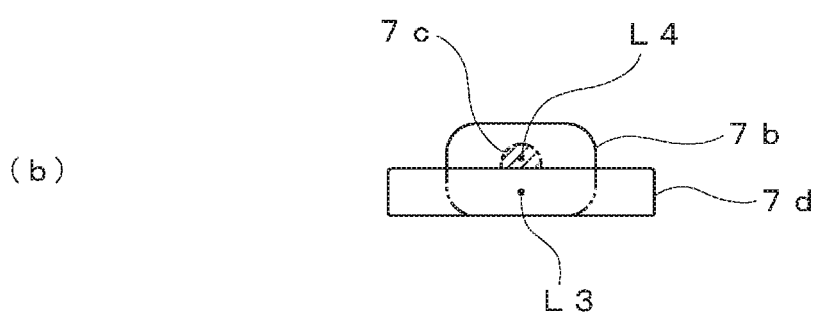

MOLDED PLASTIC ARTICLE AND METHOD OF MANUFACTURING SAME

CROSS-REFERENCE TO RELATED APPLICATIONS

This patent application is a continuation of International Application PCT/JP2017/011143, with an international filing date of Mar. 21, 2017, which in turn claims priority to Japanese Patent Application No. 2016-140416, filed on Jul. 15, 2016 in the Japan Patent Office, the entire disclosures of which are hereby incorporated by reference herein.

BACKGROUND

Technical Field

The present disclosure relates to a molded plastic article and a method of manufacturing the same, for example, a molded plastic article such as a coolant manifold used for circulating a coolant between fluid passages formed in an internal combustion engine and a radiator, and a method of manufacturing the same.

Background Art

Molded plastic articles have been used in various fields. For example, in automobiles, a coolant manifold fabricated by plastic molding is used in order to circulate coolant between fluid passages formed in the internal combustion engine and the radiator.

With regard to such molded plastic articles, a molded plastic article molded using a die slide injection molding process (DSI molding process) has been proposed in Patent Document 1. This molded plastic article is described with reference to FIG. 6 and FIG. 7.

As illustrated in FIG. 6, a molded plastic article 20 is composed of two hollow half-bodies consisting of hollow half-portions 21A, 21B and bonding portions 23A, 23B projecting outward along the edges of ends 22A, 22B of the two hollow half-portions 21A, 21B.

By bonding the bonding portions 23A, 23B of the two hollow half-bodies 24A, 24B together, a single cylindrical body is formed, and an internal space 20A is formed inside the hollow half-portions 22A, 22B.

More specifically, as illustrated in FIG. 7, concave portions 25A, 25B are formed in the joints 23A, 23B of the two hollow half-bodies 24A, 24B. When the bonding portions 23A, 23B are combined, a bonding passage 25 is formed by the concave portions 25A, 25B.

That is, first, in primary molding, molten plastic is injection-molded to form the semi-hollow half-bodies 24A, 24B. Subsequently, in secondary molding, the bonding portions 23A, 23B of the two hollow half-bodies 24A, 24B are combined to form the bonding passage 25 and molten plastic Y is injected into the bonding passage 25 to bond the bonding portions 23A and 23B to each other. As a result, a molded plastic article 20 in which the two semi-hollow bodies 24A and 24B are combined to form a single cylindrical body is obtained.

However, the die slide injection molding process (DSI molding process) is applicable not only to simple shapes such as cylinders but also to molded plastic articles of complicated shape, such as the coolant manifold. A case of applying the DSI molding process to the coolant manifold (molded plastic article) is described with reference to FIGS. 8 to 11.

As illustrated in FIG. 8, a coolant manifold (molded plastic article 30) is formed by combining a first body 30A and a second body 30B, the latter indicated by oblique lines.

A pair of coolant intake tubes 31, 32, each taking in coolant, is formed on the first body 30A so as to respectively face in the same direction.

A fluid passage 33 through which coolant from the pair of coolant intake pipes 31, 32 flows is formed in the coolant manifold 30.

As illustrated in FIG. 9, this fluid passage 33 is formed by aligning the first concave fluid passage 33A formed in the first body 30A with a second concave fluid passage (not illustrated) formed in the second body 30B.

Note that FIG. 9 is a plan view of a state in which the second body 30B is removed from the coolant manifold (molded plastic article 30). FIG. 9 shows the fluid passage 33A formed in the first body 30A.

A plastic channel 34 is formed in the first and second bodies 30A, 30B so as to surround the outer peripheries of first and second bodies 30A, 30B.

That is, a concave plastic channel 34A (the concave plastic channel in the second body 30B is not illustrated) is formed in each of the first and second bodies 30A, 30B, such that, by aligning the channels, the plastic channel 34 is formed.

Then, molten plastic from a molten plastic supply apparatus 43 that bonds together the first and second bodies 30A, 30B is injected into the plastic channel 34 and solidifies to bond together the first and second bodies 30A, 30B. In FIG. 9, the flow of molten plastic is indicated by arrows.

In the production of the coolant manifold 30 by DSI molding, as illustrated in FIG. 10(*a*), the first and second bodies 30A, 30B are injection-molded into molds 40, 41 via the primary molding.

Then, the molds 40, 41 are separated (see FIG. 10(*b*)) and the mold 41 is moved (see FIG. 10(*c*)).

Subsequently, in the secondary molding, the bonding surfaces of the first and second bodies 30A, 30B are aligned to form the plastic channel 34 and molten plastic is injected into the plastic channel 34 to bond the first and second bodies 30A, 30B together, forming the coolant manifold (molded plastic article) 30 (see FIG. 10(*d*)).

In the molten plastic of the secondary molding, in order to bond the first and second bodies 30A, 30B together (forming the primary molded product), it is necessary to prevent a weakening of the bond by the formation of a weld where the circulating molten plastic flows meet.

Therefore, as illustrated in FIG. 9, in order to provide a sufficient amount of molten plastic inside the plastic channel 34, a flow tab (also called an overflow portion) 44 for accommodating the excess molten plastic overflowing from the plastic channel 34 is provided to the molds 40, 41.

The flow tab 44 is formed by aligning concavities in the two molds 40, 41, the cross-section of which is circular in shape and which is formed in an elliptical shape in plan view. The flow tab 44 is connected to the plastic channel 34 via a connecting channel 45.

Note that, as illustrated in FIG. 9, the flow tab plastic portion 36 and a connecting plastic portion 37 for connecting the flow tab plastic portion 36 to the body portion of the coolant manifold (molded plastic article) 30 are formed on the coolant manifold (molded plastic article). However, once formed into a finished product, the flow tab plastic portion 36 is cut off at the connecting plastic portion 37.

PRIOR ART DOCUMENTS

Patent Documents

Patent Document 1 Japanese Patent No. 5471197

SUMMARY

Technical Problem

With a molded plastic article having a complicated shape like that of a coolant manifold, a lot of molten plastic is required to raise the temperature of the bonded portion. Therefore, it is necessary to provide a flow tab having a large capacity.

On the other hand, as illustrated in FIG. 11, a heat reservoir 36a is formed in the center of the molten plastic contained within the flow tab. The heat reservoir 36a arises because the molten plastic in the flow tab cools from the outer peripheral portion inward, and increases in size in proportion to the diameter (cross-sectional area) of the flow tab, in other words, in proportion to the distance between the outer surface and the interior portion. Moreover, as indicated by the arrows in FIG. 11, as the heat reservoir 36a cools and contracts, a tensile force is exerted as indicated by the arrows in FIG. 11. This tensile force is proportional to the size of the heat reservoir 36a.

Therefore, the larger the flow tab, the larger the tensile force exerted on the bonded portion of the molded plastic article. As a result, after the molten plastic solidifies, residual stress is generated at the bonded portion of the molded plastic article and the molten plastic is deformed by the residual stress, etc., giving rise to the possibility that the bonded portion of the molded plastic article will weaken.

At the same time, the molds themselves increase in size with the disposition of a large flow tab. In addition, due to constraints on mold design the molds have a circular cross-section, so that the flow tab formed in an elliptical shape in plan view has a large diameter and a small length.

However, the larger the diameter of the flow tab, the greater the tensile force acting on the bonded portion of the molded plastic article during cooling as described above.

The present disclosure is conceived as a solution to the above-described technical problem, and has as its object to provide a molded plastic article that significantly reduces residual stress at the bonded portion of the mold plastic article and minimizes weakening of the bonded portion in the molded plastic article even when a large flow tab is used, and a method of manufacturing such a molded plastic article.

Solution to the Problem

In order to solve the above-described problem, a molded plastic article according to the present disclosure comprises a first body and a second body, with the molded plastic article formed by putting together the first body and the second body to form a single unit, a concave first plastic channel formed in the first body, a concave second plastic channel formed in the second body, a bonded plastic portion formed by solidifying molten plastic inside a plastic channel formed by the first plastic channel and the second plastic channel upon putting the first body and the second body together, a connecting plastic portion formed by molten plastic flowing out from the plastic channel solidifying, with one end connected to the bonded plastic portion, and a flow tab plastic portion formed by molten plastic flowing out from the connecting portion solidifying and connected to the other end of the connecting portion, with a portion of reduced diameter or a planar portion provided to a connecting plastic portion side of the flow tab plastic portion.

The molded plastic article according to the present disclosure is characterized by having a portion of reduced diameter or a planar portion provided to a connecting plastic portion side of the flow tab plastic portion.

When forming a flow tab plastic portion having such a shape, a heat reservoir is not readily formed on the connecting plastic portion side even while increasing the capacity of the flow tab of the molds.

As a result, it is possible to significantly reduce the residual stress on the bonded portion of the molded plastic article and weakening of the bonded portion of the molded plastic article.

Preferably, in a plane perpendicular to a bonding surface for bonding the first body and the second body together, a centerline of either the portion of reduced diameter or the planar portion of the flow tab plastic portion and a centerline of a body portion of the flow tab plastic portion are not collinear.

In so doing, even in a case in which the centerline of the main body portion of the flow tab plastic portion is offset from the centerline of the portion of reduced diameter or the planar portion of the flow tab plastic portion in a plane perpendicular to a bonding surface for bonding the first body and the second body together, it is possible to significantly reduce the residual stress at the joint plastic portion 6 of the molded plastic article and weakening of the bonded portion of the molded plastic article similar to a case in which the centerline and the centerline are collinear.

Moreover, even in a case in which the centerlines are not collinear, any weakening of the bonded portion is minimized, with the result that the degree of freedom of disposition of the flow tab 44 in the molds is increased and constraints on the disposition can be reduced.

Similarly, preferably, in a plane parallel to the bonding surface bonding the first body and the second body together, the centerline of either the portion of reduced diameter or the planar portion of the flow tab plastic portion and the centerline of the body portion of the flow tab plastic portion are not collinear.

In so doing, even in a case in which the centerline of the main body portion of the flow tab plastic portion is offset from the centerline of the portion of reduced diameter or the planar portion of the flow tab plastic portion in a plane parallel to the bonding surface for bonding the first body and the second body together, it is possible to significantly reduce the residual stress at the joint plastic portion of the molded plastic article and weakening of the bonded portion of the molded plastic article similar to a case in which the centerline and the centerline are collinear.

Further, even when the centerlines are not collinear, any weakening of the bonded portion is minimized, so that the degree of freedom of disposition of the flow tab 44 in the molds is increased and constraints on the disposition can be reduced.

Moreover, preferably, at a site where the connecting plastic portion is formed in the first plastic channel of the first body and the second plastic channel of the second body, a projection is formed in the plastic channels of the first and second bodies opposite the connecting plastic portion.

With the projection formed in this manner, the molten plastic flowing through the plastic channel formed by the first plastic channel in the first body and the second plastic channel in the second body can be directed to the connecting channel portion and the flow tab, thereby ensuring that the flow tab plastic portion and the connecting plastic portion can be reliably formed.

In addition, a method of manufacturing the above-described molded plastic article according to the present disclosure conceived as a solution to the above-described problem comprises the steps of setting a molded first body and a molded second body in molds having a concave connecting channel portion that forms the connecting plastic portion and a concave flow tab that forms the flow tab plastic portion; moving the molds to contact the first body and the second body together to form a plastic channel composed of the first plastic channel and the second plastic channel; injecting molten plastic into the channel; and solidifying the molten plastic injected into the channel and, after the connecting plastic portion and the flow tab plastic portion are formed, removing the now-combined first body and the second body from the molds.

With such a method of manufacture, it is possible to obtain a molded plastic article that significantly reduces residual stress at the bonded portion of the molded plastic article and weakening of the bonded portion.

Effects

According to the present disclosure, it is possible to obtain a molded plastic article and a method of manufacturing a molded plastic article that significantly reduces residual stress at the joint of the molded plastic article and weakening of the bonded portion of the molded plastic article even when the flow tab plastic portion is formed large.

BRIEF DESCRIPTION OF THE DRAWINGS

FIG. 3 is a diagram for explaining a heat reservoir of the flow tab plastic portion illustrated in FIG. 1, and is a plan view in a plane parallel to the plane of the joint that joins the first body and the second body together.

FIG. 4 is a diagram illustrating a first variation of the flow tab plastic portion illustrated in FIG. 2, and is a plan view in a plane parallel to the plane of the joint that joins the first body and the second body together.

FIG. 5 is a diagram illustrating a second variation of the flow tab plastic portion illustrated in FIG. 2, wherein (a) is a plan view in a plane parallel to the plane of the joint that joins the first body and the second body together and (b) is a sectional view along line IV-IV in (a).

DETAILED DESCRIPTION

Embodiments of a molded plastic article according to the present disclosure are described with reference to FIGS. 1 to 3, using a coolant manifold as an example. It is to be noted that the present disclosure is not limited to a coolant manifold and is applicable to any general-purpose molded plastic article.

Like a conventional coolant manifold 30, a coolant manifold 1 is composed of a first body and a second body. FIG. 1 shows a plan view of the secondary molded plastic article, from which the second body is omitted.

A pair of coolant intake pipes 2, 3, each of which takes in coolant, is formed on the first body 1A so as to face in the same direction.

Figure 1:
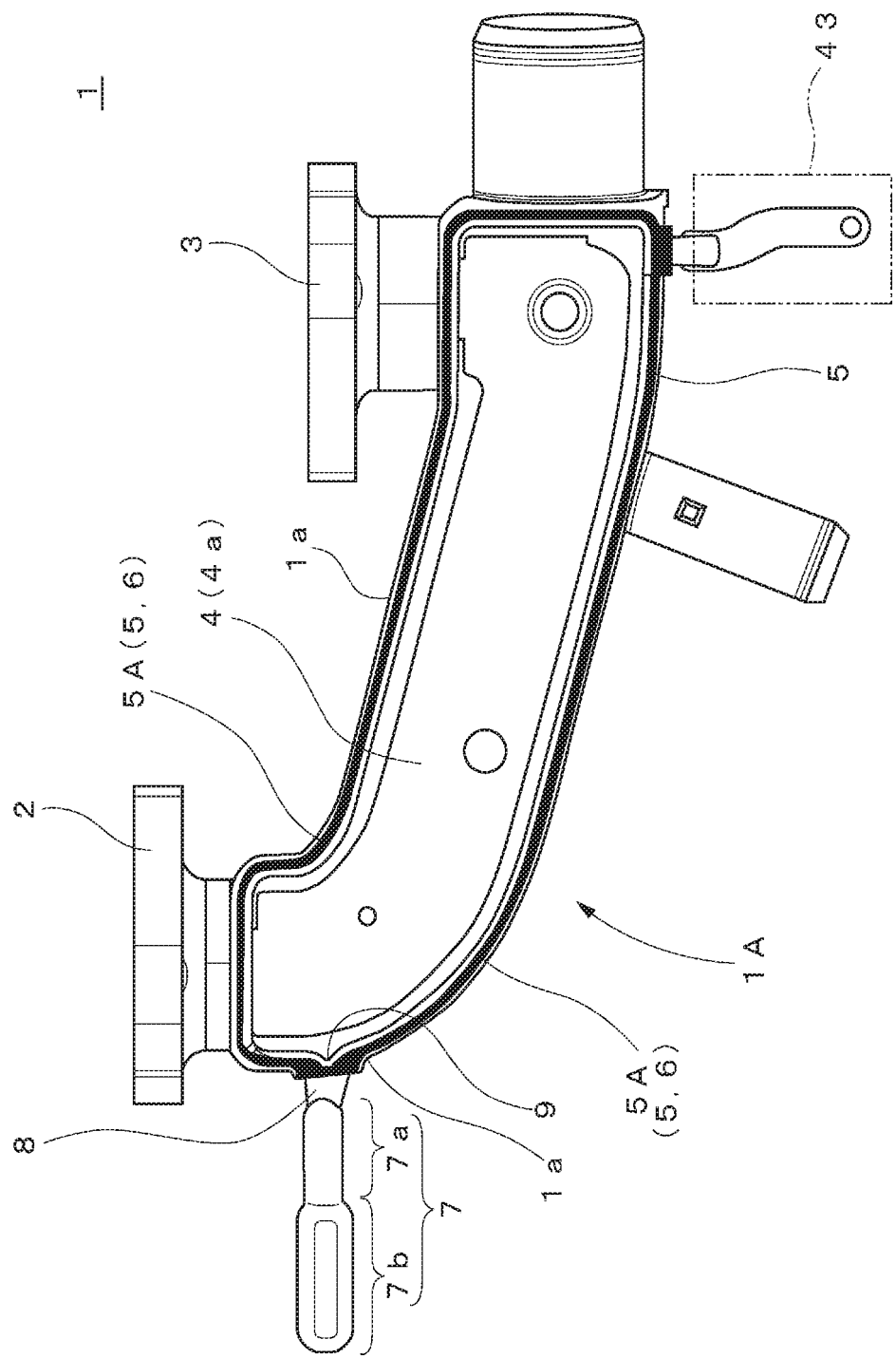
FIG. 1 is a plan view of a first embodiment of a molded plastic article according to the present disclosure (from which the second body is omitted).

As illustrated in FIG. 1, a fluid passage 4 that collects the coolant from the pair of coolant intake pipes 2, 3 is formed in such a way that the pair of coolant intake pipes 2, 3 communicate with each other inside the coolant manifold 1.

The fluid passage 4 is formed by aligning a concave first fluid passage 4a formed in the first body 1A and a second concave fluid passage (not illustrated) formed in the second body.

That is, the coolant manifold 1 is provided with a first body and a second body and the first body and the second body are put together to form a single unit, such that a single fluid passage 4 composed of the first and second concave fluid passages within the coolant manifold 1 is formed.

A bonding surface 1a that bonds with the second body is formed along the outer peripheral edge of the first body 1A. Although not illustrated, a bonding surface that contacts the bonding surface 1a is formed along the outer peripheral edge of the second body as well.

A concave first plastic channel 5A is formed in the bonding surface 1a of the first body 1A. Similarly, a concave second plastic channel is formed in the bonding surface of the second body 1B as well.

Thus, by contacting the bonding surface 1a of the first body against the bonding surface of the second body (not Illustrated), a single plastic channel 5 constructed of the first plastic channel 5A and the second plastic channel (not illustrated) is formed.

Subsequently, molten plastic is injected into the plastic channel 5 formed by the first plastic channel 5A and the second plastic channel and hardened, by which the bonding plastic portion 6 that joins together the first body 1A and the second body is formed. In FIG. 1, the bonding plastic portion 6 is represented by the blacked-out portion.

With the bonding plastic portion 6, the first body 1A and the second body are bonded together, and an integrated coolant manifold 1 is constructed.

In addition, a flow tab plastic portion 7 and a connecting plastic portion 8 that connects the flow tab plastic portion 7 with the coolant manifold 1 are formed on the coolant manifold 1.

Figure 10:
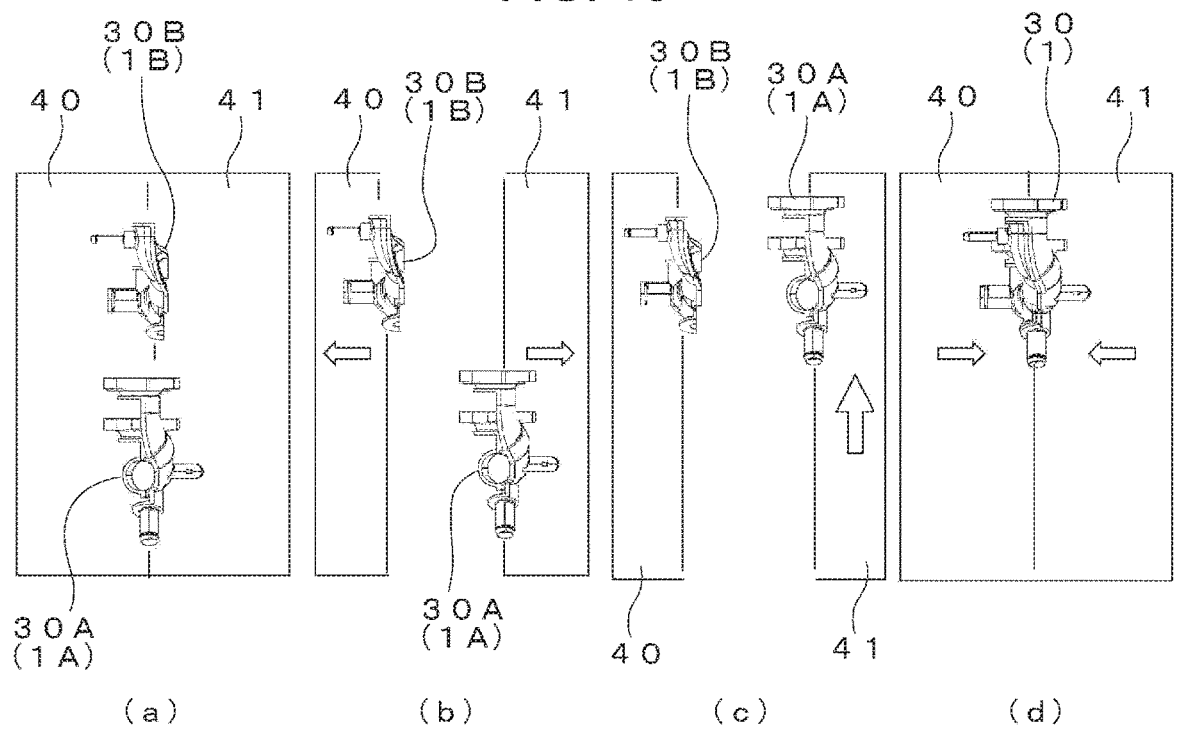
FIG. 10 is a process diagram illustrating a case in which the DSI molding process is applied to the coolant manifold illustrated in FIG. 8.
Figure 11:
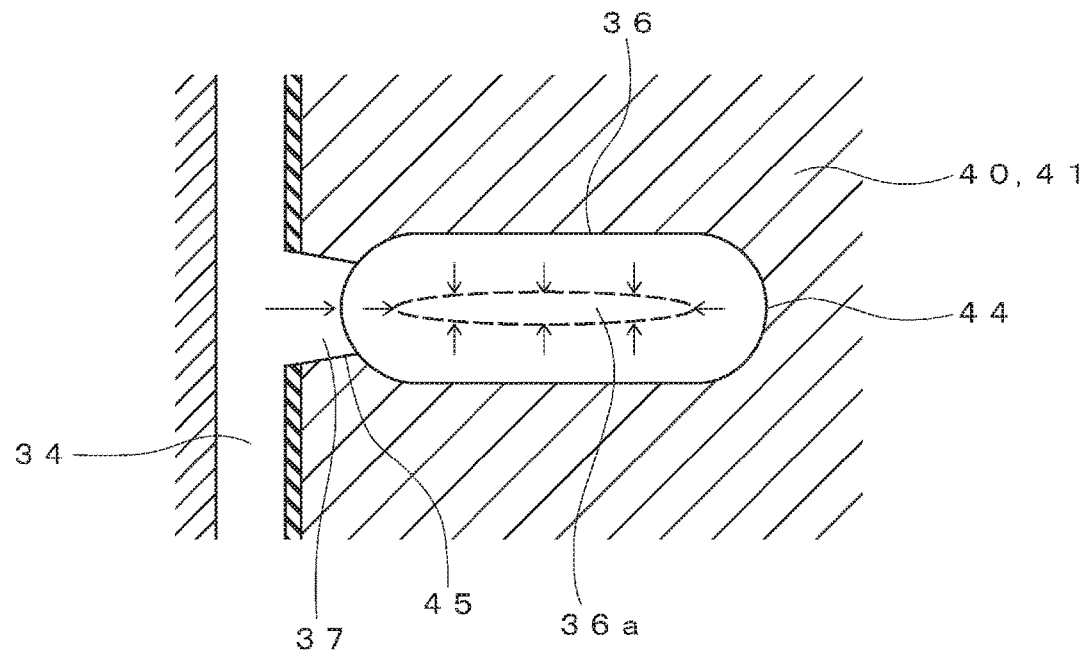
FIG. 11 is a plan view for explaining a heat reservoir flow tab plastic portion.

In order to ensure a secure bond between the first body 1A and the second body, a sufficient amount of molten plastic must flow into the plastic channel 5, and excess molten plastic injected into the plastic channel 5 is collected in the flow tab 44 formed in the molds 40, 41 (see FIG. 10). To this end, the molds 40, 41 are provided with a connecting channel portion 45 having one end connected to the plastic channel 5 and the flow tab 44 connected to the other end of the connecting channel portion.

The connecting plastic portion 8 is a plastic portion solidified in the connecting channel portion 45. The flow tab plastic portion 7 is a plastic portion solidified in the flow tab 44.

Figure 2:
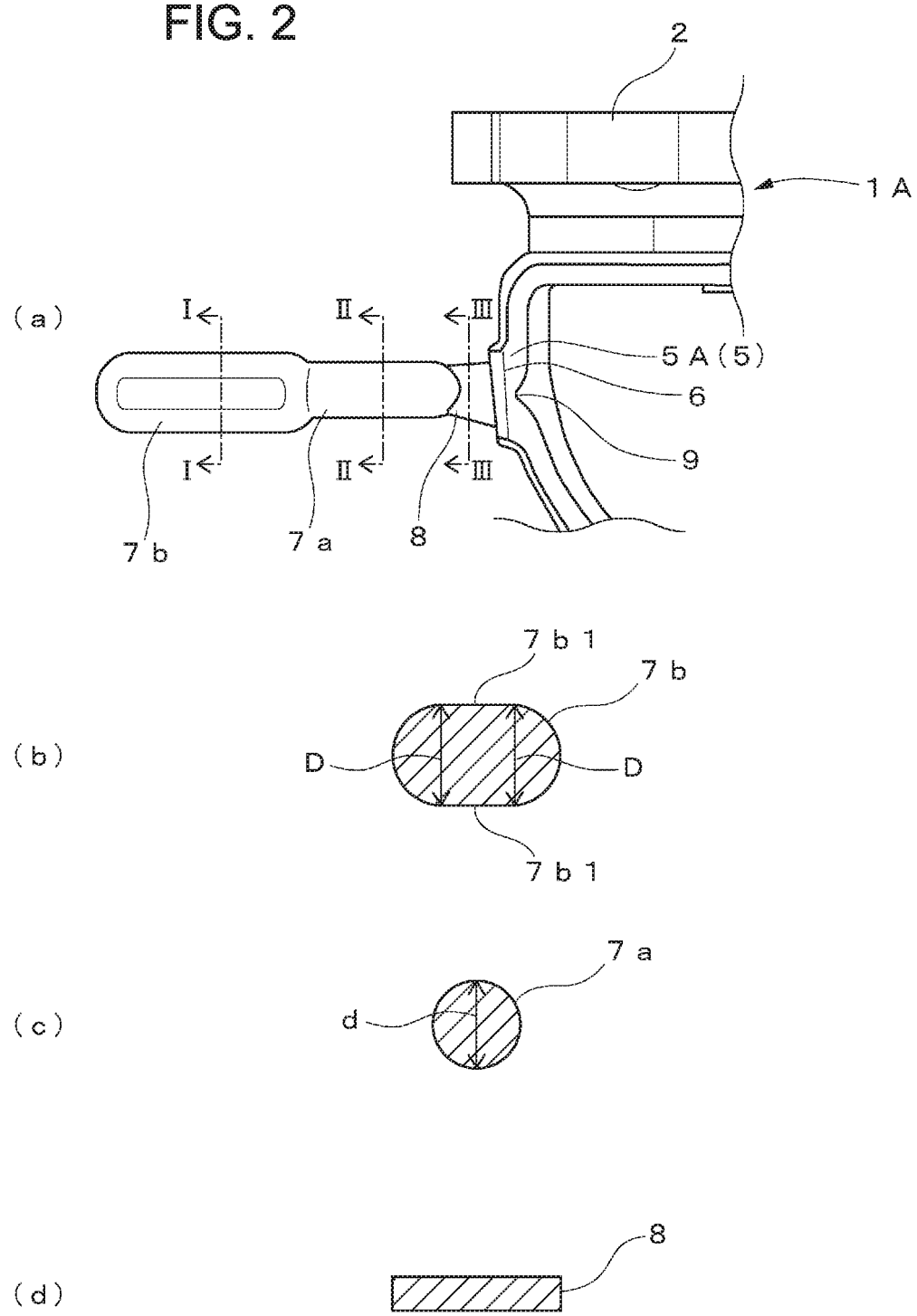
FIG. 2 is an enlarged view of the main parts of the molded plastic article illustrated in FIG. 1, in which (a) is a plan view of a connecting plastic portion and flow tab plastic portion of the molded plastic article illustrated in FIG. 1, (b) is a sectional view along a line I-I in (a), (c) is a sectional view along line II-II in (a), and (d) is a sectional view along line III-III in (a).
Figure 6:
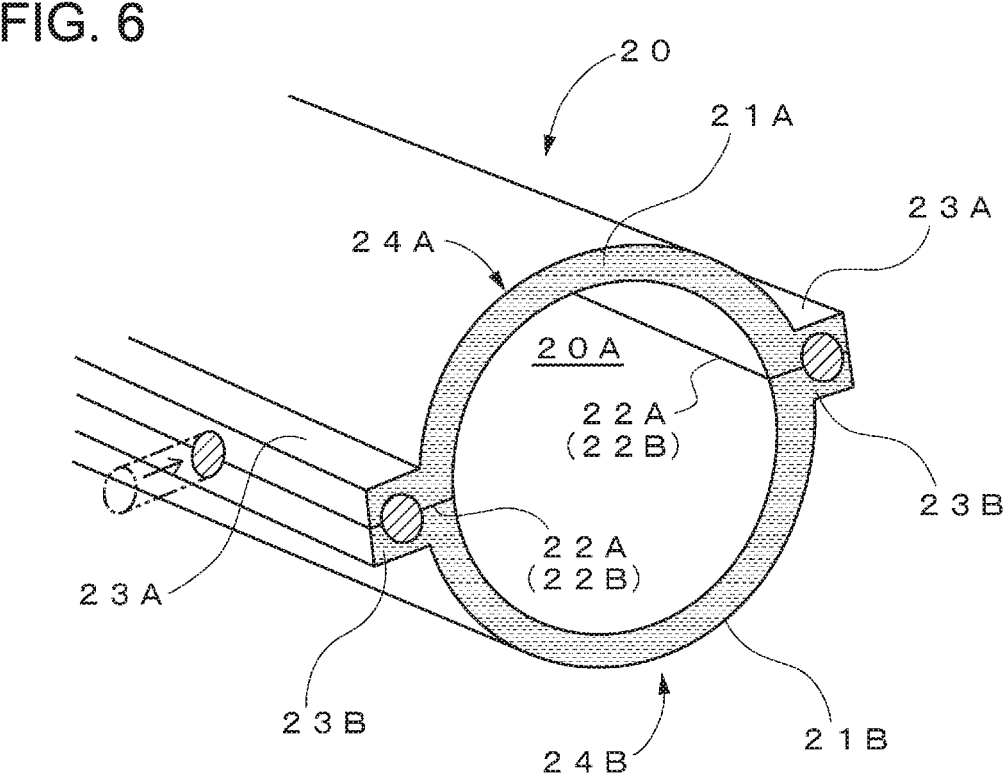
FIG. 6 is a perspective view of a molded plastic article molded using a conventional DSI molding process.
Figure 7:
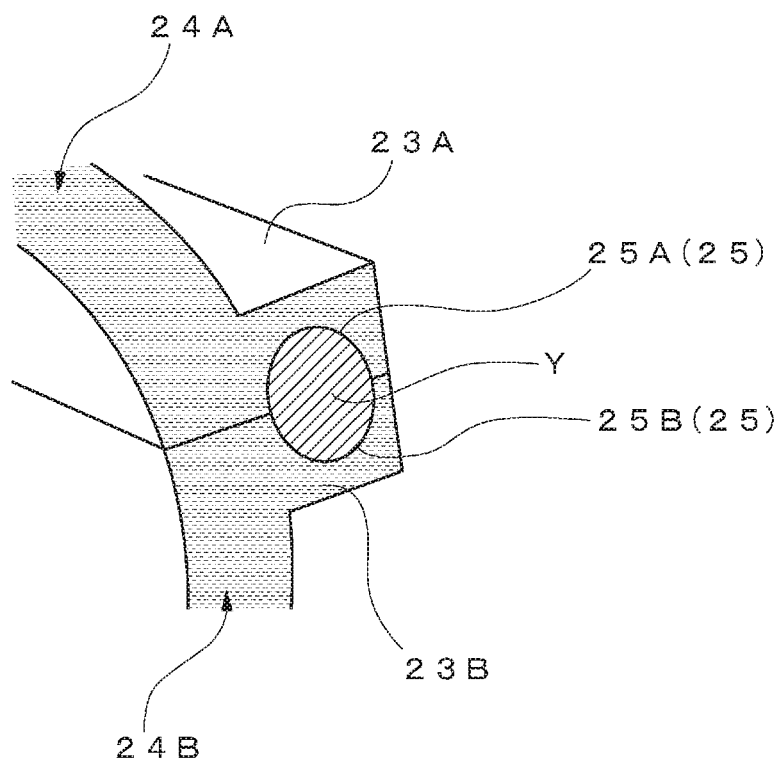
FIG. 7 is an enlarged view of the main parts in FIG. 6.
Figure 8:
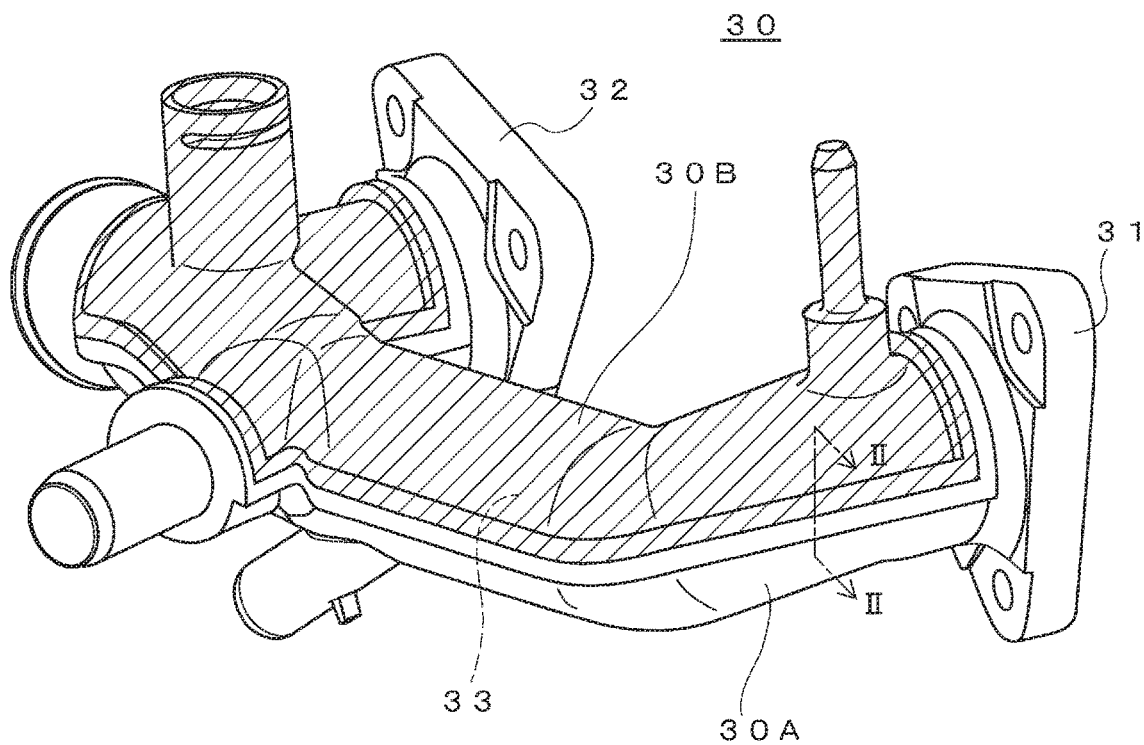
FIG. 8 is a perspective view of a coolant manifold molded using the conventional DSI molding process.
Figure 9:
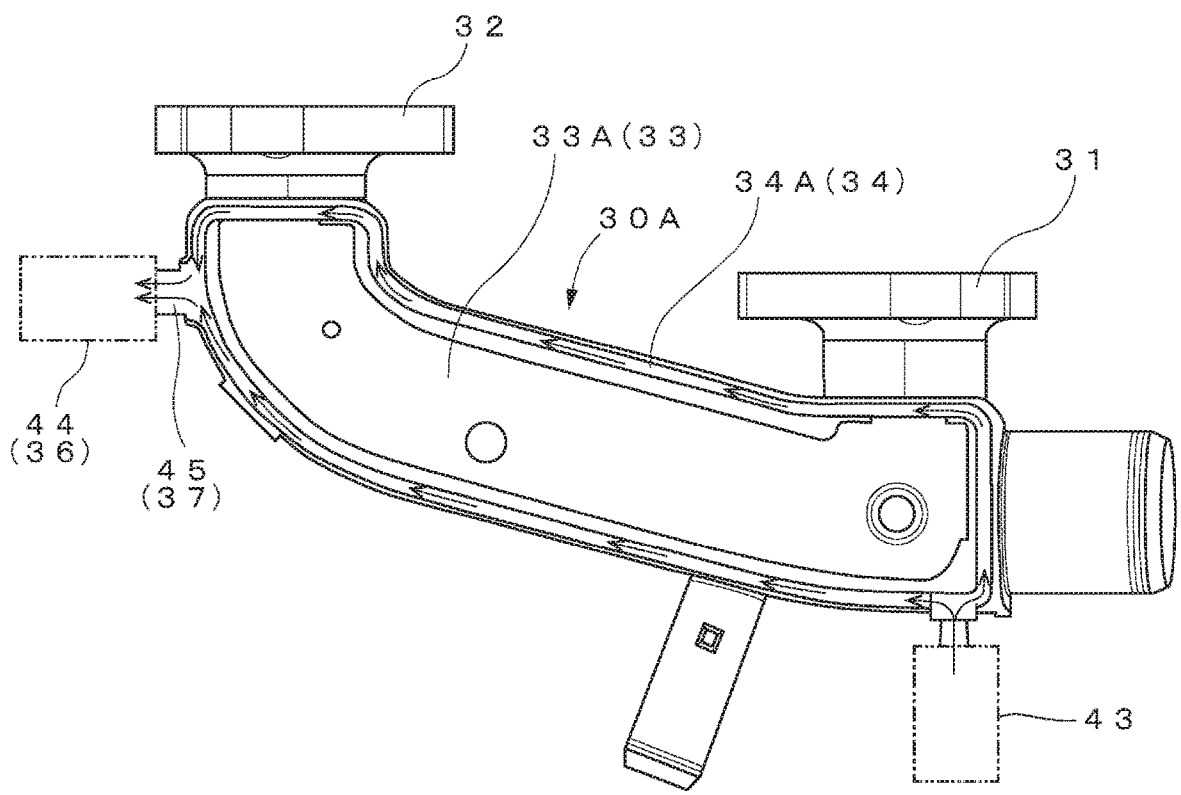
FIG. 9 is a plan view of the coolant manifold illustrated in FIG. 8 without the second body.

In addition, as illustrated in FIGS. 1 and 2, at the site where connecting plastic portion 8 is formed in the plastic channel 5A of the first body 1A and the plastic channel of the second body, a projection 9 for directing the molten plastic toward the connecting channel portion 45 is formed in the side of the plastic channel 5A of the first body 1A and the plastic channel of the second body opposite the connecting channel portion 45 (the connecting plastic portion 8).

The projection 9 enables the molten plastic flowing through the plastic channel 5 formed by the first body 1A and the second body to flow smoothly into the flow tab 44 and the connecting channel portion 45 formed by the molds 40, 41, thereby ensuring that the flow tab plastic portion 7 and the connecting plastic portion 8 can be reliably formed.

Referring to FIG. 2, the flow tab plastic portion 7 and the connecting plastic portion 8 are described. Note that FIG. 2(b), (c), (d) are diagrams of cross-sections perpendicular to the bonding surface (the contact surface) for bonding the first body and the second body together, and are cross-sections along lines I-I, II-II, in FIG. 2(a), respectively.

As illustrated in FIG. 2, in the plane perpendicular to the bonding surface for bonding together the first body and the second body, the cross-section of the flow tab plastic portion 7 is formed in a circular shape or elliptical shape, and a portion of reduced diameter 7a is provided on the connecting plastic portion 8 side.

That is, the flow tab plastic portion 7 is composed of a main body portion 7b, on which planar portions 7b1 are formed above and below a circular shape of diameter D, and a circular portion of reduced diameter 7a having a diameter d smaller than the diameter D of the main body portion 7b.

Thus, a portion of reduced diameter 7a is provided on the connecting plastic portion 8 side of the flow tab plastic portion 7. Since the diameter (cross-sectional area), that is, the distance between the outer surface and the center portion, of the portion of reduced diameter 7a is smaller than the body portion 7b of the flow tab plastic portion 7, the portion of reduced diameter 7a is cooled before the main body portion 7b and a heat reservoir 7c is formed in the main body portion 7b.

Therefore, even when enlarging the capacity of the flow tab, the heat reservoir 7c does not readily form in the connecting plastic portion 8 side of the flow tab plastic portion 7.

That is, as illustrated in FIG. 3, since the heat reservoir 7c is formed in the main body portion 7b of the flow tab plastic portion 7, when the heat reservoir 7c is cooled and contracts, a tensile force acts on the portion of reduced diameter 7a. However, since the diameter of the portion of reduced diameter 7a is small, the effect on the bonded portion can be reduced to the maximum extent possible.

As a result, it is possible to significantly reduce the residual stress at the bonded portion of the molded plastic article and the bonded portion of the molded plastic article can be prevented from weakening.

In addition, as illustrated in FIG. 2(d), the connecting plastic portion 8 has a rectangular cross section. By forming the connecting plastic portion 8 in a flat planar shape, it is configured so that it can be easily cut when cutting off the connecting plastic portion 8.

Variations of the flow tab plastic portion are illustrated in FIG. 4 and FIG. 5. The variation shown in FIG. 4 illustrates a case in which, in a plane parallel to the bonding surface for bonding together the first body and the second body, a centerline L1 of the flow tab plastic portion main body 7b and a centerline L2 of the portion of reduced diameter 7a of the flow tab plastic portion are not necessarily collinear.

That is, even in a case in which the centerline L1 of the main body portion 7b is offset from the centerline L2 of the portion of reduced diameter 7a (i.e., the main body 7b of the flow tab plastic portion is formed at a position offset from the portion of reduced diameter 7a), similar to a case in which the centerline L1 and the centerline L2 are collinear, it is possible to significantly reduce the residual stress at the joint plastic portion 6 of the molded plastic article and weakening of the bonded portion of the molded plastic article.

Moreover, since the centerline L1 of the body portion 7b of the flow tab plastic portion and the centerline L2 of the portion of reduced diameter 7a diameter 7a of the flow tab plastic portion can be offset from each other, constraints on the disposition of the flow tab 44 in the molds can be reduced.

The variation shown in FIG. 5 illustrates a case in which a planar portion 7d is formed on the connecting plastic portion side of the flow tab plastic portion 7, and in a plane perpendicular to the bonding surface for bonding together the first body and the second body, a centerline L3 of the planar portion 7d and a centerline L4 of the main body 7b of the flow tab plastic portion 7 need not be collinear.

That is, even in a case in which the centerline L4 of the main body portion 7b of the flow tab plastic portion is offset from the centerline L3 of the planar portion 7d (by shifting the location of the body portion 7b of the flow tab plastic portion), centerline L4 and centerline L3, similar to a case in which the centerline L1 and the centerline L2 are collinear, it is possible to significantly reduce the residual stress at the joint plastic portion 6 of the molded plastic article and weakening of the joint portion of the molded plastic article.

Moreover, since the centerline L4 of the flow tab plastic portion of the body portion 7b and the centerline L3 of the planar portion 7d can be offset from each other, constraints on the disposition of the flow tab 44 in the molds can be reduced.

Next, a description is given of a method of manufacturing the above-described coolant manifold. Since the method of manufacturing the coolant manifold is largely unchanged from the conventional method, a description thereof proceeds with reference to FIG. 10 as necessary. Note that, in FIG. 10, the first body is denoted by reference numeral 1A and the second body is denoted by 1B.

First, as illustrated in FIG. 10(a), through a primary molding process, the first and second bodies 1A, 1B are formed and the molds are separated as shown in FIG. 10(b).

Next, the molded first body 1A and second body 1B are set facing each other in the molds (see FIG. 10(c)). At this time, the first body 1A and the second body 1B are set opposite each other.

Note that the molds that set the first body 1B and the second body 1B facing each other may be the same molds used in the primary molding process or they may be molds different from the molds used in the primary molding process.

Subsequently, the molds are moved and the first body 1A and the second body 1B are pushed together to form the plastic channel 5. Then, melted synthetic plastic is injected into the plastic channel 5 from the plastic injection port and a bonded plastic portion 6 that bonds together the first body 1A and the second body 1B in a single unit is formed as the molten plastic injected into the plastic channel 5 solidifies.

Molten plastic flowing out from the plastic channel 5 forms the connecting plastic portion 8 and the flow tab plastic portion 7.

Thereafter, removing the first body 1A and the second body 1B from the molds completes the coolant manifold 1. Note that in order to achieve the final form of the coolant manifold 1 as a product, it is necessary to cut off the connecting plastic portion 8 and cut away the flow tab plastic portion 7.

According to such a method of manufacture, it is possible to significantly reduce the residual stress at the bonded portion of the molded plastic article and obtain a mold plastic article that minimizes weakening of the bonded portion.

In the above-described embodiment, a molded plastic article has been described using a coolant manifold as an example. However, the present disclosure is not particularly limited thereto, and can be used when combining various primary molded articles into a single unit, and is also applicable to combining molded articles of simple shape into single units.

In addition, in the so-called secondary molding (formation of the bonding portion) in which molded articles are combined to form a single whole unit, the molds used in primary molding may be used or other molds may be used instead.

Description of Reference Numerals and Characters

1 coolant manifold
1A First body
1B Second body
5 First body bonding surface
5A First plastic channel
6 Bonded plastic portion
7 Flow tab plastic portion
7a Body portion of flow tab plastic portion
7b Portion of reduced diameter of flow tab plastic portion
7c Heat reservoir
7d Planar portion of flow tab plastic portion
8 Connecting plastic portion
9 Projection
D Diameter of body portion of flow tab plastic portion
D Diameter of portion of reduced diameter of flow tab plastic portion
L1 Centerline of the body portion of the flow tab plastic portion in a plane parallel to a bonding surface at which the first body and the second body are bonded together
L2 Centerline of the portion of reduced diameter of the flow tab plastic portion in a plane parallel to a bonding surface at which the first body and the second body are bonded together
L3 Centerline of the planar portion of the flow tab plastic portion in a plane perpendicular to the bonding surface at which the first body and the second body are bonded together.
L4 Centerline of the body portion of the flow tab plastic portion in a plane perpendicular to the bonding surface at which the first body and the second body are bonded together.

What is claimed is:

1. A molded plastic article comprising:
a first body; and
a second body,
the molded plastic article formed by putting together the first body and the second body to form a single unit,
a concave first plastic channel formed in the first body,
a concave second plastic channel formed in the second body,
a bonded plastic portion formed by solidifying molten plastic inside a plastic channel formed by the first plastic channel and the second plastic channel upon putting the first body and the second body together,
a connecting plastic portion formed by molten plastic flowing out from the plastic channel solidifying, with one end connected to the bonded plastic portion, and
a flow tab plastic portion formed by molten plastic flowing out from the connecting resin portion solidifying and connected to the other end of the connecting portion,
a portion of reduced diameter or a planar portion provided to a connecting plastic portion side of the flow tab plastic portion,
wherein the flow tab plastic portion is provided at a position separated from the first body and the second body by the connecting plastic portion,
the connecting portion and the flow tab plastic portion project along an extension of a plane of a bonding surface bonding the first body and the second body together, and
a projection is formed in an interior side of the first plastic channel and the second plastic channel away from the connecting plastic portion, the projection projecting into the first plastic channel and the second plastic channel toward the connecting plastic portion and shaped to direct the flow of molten plastic toward the connecting plastic portion and the flow tab plastic portion.

2. The molded plastic article according to claim 1,
wherein, in a plane perpendicular to the bonding surface bonding the first body and the second body together, a centerline of either the portion of reduced diameter or the planar portion of the flow tab plastic portion and a centerline of a body portion of the flow tab plastic portion are not collinear.

3. The molded plastic article according to claim 1,
wherein, in a plane parallel to the bonding surface bonding the first body and the second body together, a centerline of either the portion of reduced diameter or the planar portion of the flow tab plastic portion and a centerline of the body portion of the flow tab plastic portion are not collinear.

4. The molded plastic article according to claim 2,
wherein, in a plane parallel to the bonding surface bonding the first body and the second body together, the centerline of either the portion of reduced diameter or the planar portion of the flow tab plastic portion and the centerline of the body portion of the flow tab plastic portion are not collinear.

5. A method of manufacturing the molded plastic article according to claim 1, comprising:
a step of setting a molded first body and a molded second body in molds having a concave connecting channel portion that forms the connecting plastic portion and a concave flow tab that forms the flow tab plastic portion;
a step of moving the molds to contact the first body and the second body together to form a plastic channel composed of the first plastic channel and the second plastic channel;
a step of injecting molten plastic into the channel; and
a step of solidifying the molten plastic injected into the channel and, after the connecting plastic portion and the flow tab plastic portion are formed, removing the now-combined first body and the second body from the molds.

\* \* \* \* \*